US012772923B2

(12) United States Patent
Barry

(10) Patent No.: US 12,772,923 B2
(45) Date of Patent: Oct. 27, 2026

(54) LOAD CELL BACKING PLATE AND ASSOCIATED DEVICES, SYSTEMS, AND METHODS

(71) Applicant: Ag Leader Technology, Ames, IA (US)

(72) Inventor: Alan F. Barry, Nevada, IA (US)

(73) Assignee: Ag Leader Technology, Ames, IA (US)

( * ) Notice: Subject to any disclaimer, the term of this patent is extended or adjusted under 35 U.S.C. 154(b) by 728 days.

(21) Appl. No.: 18/102,022

(22) Filed: Jan. 26, 2023

(65) Prior Publication Data

US 2023/0232733 A1 Jul. 27, 2023

Related U.S. Application Data

(60) Provisional application No. 63/303,114, filed on Jan. 26, 2022.

(51) Int. Cl.
*A01C 7/20* (2006.01)

(52) U.S. Cl.
CPC .................................... *A01C 7/205* (2013.01)

(58) Field of Classification Search
CPC ................................ A01C 7/205; A01C 5/068
See application file for complete search history.

(56) References Cited

U.S. PATENT DOCUMENTS

| | | | | |
|---|---|---|---|---|
| 54,633 | A | | 5/1866 | Wilkinson |
| 605,348 | A | | 6/1898 | Schultz |
| 1,178,765 | A | | 4/1916 | Waterman |
| 1,252,923 | A | | 1/1918 | Moench |
| 1,678,643 | A | | 7/1928 | Kassebeer |
| 1,731,356 | A | | 10/1929 | Smith |
| 2,357,760 | A | | 9/1944 | Peacock |
| 2,525,435 | A | | 10/1950 | White |
| 3,233,523 | A | | 2/1966 | Passaggio |
| 3,463,010 | A | * | 8/1969 | Hatschek ................ G01L 23/02 73/756 |
| 3,509,837 | A | | 5/1970 | Erickson |
| 3,718,191 | A | | 2/1973 | Williams |
| 3,749,035 | A | | 7/1973 | Cayton |
| 3,797,418 | A | | 3/1974 | Bridger |

(Continued)

FOREIGN PATENT DOCUMENTS

| | | | |
|---|---|---|---|
| AU | 2006203367 | A1 | 2/2007 |
| AU | 2010201330 | A1 | 3/2011 |

(Continued)

OTHER PUBLICATIONS

Baumalight—https://baumalight.com/undertow/en/plows.php.

(Continued)

*Primary Examiner* — Octavia Hollington
(74) *Attorney, Agent, or Firm* — DENTONS DAVIS BROWN PC; Matthew Warner-Blankenship; Kassandra Rittmer

(57) ABSTRACT

A load cell adaptor having a first side for facing a row unit and including at least one contact pad engaged with the row unit, a second side comprising a seat, the seat shaped to be engaged with a load cell, and an opening shaped for engagement with a bolt. The load cell adaptor configured to provide a structure for precise use of a load cell on a traditional row unit.

6 Claims, 13 Drawing Sheets

(56) References Cited

U.S. PATENT DOCUMENTS 3,821,550 A 6/1974 Priest
3,844,357 A 10/1974 Ellinger
4,091,964 A 5/1978 Harrer
4,116,139 A 9/1978 Sauer
4,119,157 A 10/1978 Schuck
4,167,910 A 9/1979 Pretzer
4,193,458 A 3/1980 Long
4,209,109 A 6/1980 Cur
4,241,849 A 12/1980 Harrer
4,244,123 A 1/1981 Lazure et al.
4,329,911 A 5/1982 Schwerin
4,359,104 A 11/1982 Haapala
4,397,585 A 8/1983 Fouss
4,417,530 A 11/1983 Kopecky
4,596,200 A 6/1986 Gafford
4,603,645 A 8/1986 Wiemeyer
4,646,663 A 3/1987 Nikkel
4,655,296 A 4/1987 Bourgault
4,700,785 A 10/1987 Bartusek
4,720,929 A 1/1988 Umberson
4,736,534 A 4/1988 Daniels
4,765,423 A * 8/1988 Karpa .................. G01G 3/1414 73/862.622
4,784,524 A 11/1988 Stine
4,796,550 A 1/1989 Van Natta
4,865,132 A 9/1989 Moore
4,872,785 A 10/1989 Schrage et al.
4,878,443 A 11/1989 Gardner
4,913,070 A 4/1990 Morrison
4,920,680 A 5/1990 Lindgren
4,949,656 A 8/1990 Iyle
4,986,782 A 1/1991 severtson
5,065,681 A 11/1991 Hadley
5,069,779 A 12/1991 brown
5,074,227 A 12/1991 Schwitters
5,103,924 A 4/1992 Walker
5,139,751 A 8/1992 Mansfield
5,163,518 A 11/1992 Foley
5,170,909 A 12/1992 Lundle
5,234,060 A 8/1993 Carter
5,277,257 A 1/1994 Thompson
5,366,024 A 11/1994 Payne
5,425,318 A 6/1995 Keeton
5,427,182 A 6/1995 Winter
5,431,117 A 7/1995 Steffens et al.
5,479,992 A 1/1996 Bassett
5,497,837 A 3/1996 Kehrney
5,499,683 A 3/1996 Bassett
5,529,128 A 6/1996 Peterson
5,558,465 A 9/1996 Pecot
5,585,626 A 12/1996 Beck et al.
5,632,212 A 5/1997 Barry
5,664,507 A 9/1997 Bergland
5,709,271 A 1/1998 Bassett
5,789,741 A 8/1998 Kinter et al.
5,793,035 A 8/1998 Beck
5,829,535 A 11/1998 Line
5,842,428 A 12/1998 Stufflebeam et al.
5,862,764 A 1/1999 Umemoto
5,936,234 A 8/1999 Thomas
5,961,573 A 10/1999 Hale
5,978,723 A 11/1999 Hale et al.
6,003,455 A 12/1999 Flamme
6,013,020 A 1/2000 Meloul
6,016,713 A 1/2000 Hale
6,041,582 A 3/2000 Tiede et al.
6,068,063 A 5/2000 Mayerle
6,068,064 A 5/2000 Bettin
6,081,224 A 6/2000 Rosenbrock
6,091,997 A 7/2000 Flamme
6,116,172 A 9/2000 Prairie
6,119,608 A 9/2000 Peterson
6,119,837 A 9/2000 Tschurbanoff
6,193,440 B1 2/2001 Pidgeon
6,299,381 B1 10/2001 Liebrecht, Jr.
6,325,156 B1 12/2001 Barry
6,378,619 B2 4/2002 Mayerle
6,389,999 B1 5/2002 Duello
6,460,623 B1 10/2002 Knussman
6,681,706 B2 1/2004 Sauder et al.
6,701,857 B1 3/2004 Jensen
6,748,885 B2 6/2004 Sauder et al.
6,758,153 B1 7/2004 Hagen et al.
6,827,029 B1 12/2004 Wendte
6,863,006 B2 3/2005 Sandoval
7,004,090 B2 2/2006 Swanson
7,081,611 B2 7/2006 Scott
7,131,384 B2 11/2006 Kester
7,263,937 B2 9/2007 Frasier
7,331,436 B1 2/2008 Pack
7,334,532 B2 2/2008 Sauder et al.
7,395,767 B2 7/2008 Sulman
7,395,769 B2 7/2008 Jensen
7,478,603 B2 1/2009 Riewerts
7,493,836 B2 * 2/2009 Wolfer .................... G01L 5/167 73/866.5
7,540,246 B2 6/2009 Friesen
7,584,707 B2 9/2009 Sauder
7,673,570 B1 3/2010 Bassett
7,694,638 B1 4/2010 Riewerts
7,699,009 B2 4/2010 Sauder et al.
7,717,048 B2 5/2010 Peterson, Jr. et al.
7,870,826 B2 1/2011 Bourgault
7,938,074 B2 5/2011 Liu
7,980,186 B2 7/2011 Henry
8,020,657 B2 9/2011 Allard
8,056,465 B2 11/2011 Carlz
8,078,367 B2 12/2011 Sauder
8,201,507 B2 6/2012 Sauder
8,275,525 B2 9/2012 Kowalchuk
8,275,627 B2 9/2012 Henning
8,286,566 B2 10/2012 schilling
8,342,258 B2 1/2013 Ryder
8,346,442 B2 1/2013 Ryder
8,371,239 B2 2/2013 Rans et al.
8,418,636 B2 4/2013 Liu et al.
8,430,179 B2 4/2013 Van Buskirk
8,448,587 B2 5/2013 Kowalchuk
8,448,717 B2 5/2013 America
8,451,449 B2 5/2013 Holland
8,479,671 B2 7/2013 Shoup
8,522,889 B2 9/2013 Adams et al.
8,544,397 B2 10/2013 Bassett
8,544,398 B2 10/2013 Bassett
8,550,020 B2 10/2013 Sauder et al.
8,561,472 B2 10/2013 Sauder et al.
8,573,111 B2 11/2013 Graham
8,634,992 B2 1/2014 Sauder et al.
8,636,077 B2 1/2014 Bassett
8,755,049 B2 6/2014 Holland
8,763,713 B2 7/2014 Bassett
8,770,308 B2 7/2014 Bassett
8,776,702 B2 7/2014 Bassett
RE45,091 E 8/2014 Bassett
8,814,474 B2 8/2014 bell
8,850,998 B2 10/2014 Garner
8,863,857 B2 10/2014 Bassett
8,903,545 B2 12/2014 Riffel
8,909,436 B2 12/2014 Achen
8,910,582 B2 12/2014 Mariman et al.
8,924,092 B2 12/2014 Achen
8,924,102 B2 12/2014 Sauder et al.
RE45,412 E 3/2015 Sauder et al.
8,978,564 B2 3/2015 Hagny
8,985,037 B2 3/2015 Radtke
8,985,232 B2 3/2015 Bassett
9,055,712 B2 6/2015 Bassett
9,107,337 B2 8/2015 Bassett
9,107,338 B2 8/2015 Bassett
9,113,589 B2 8/2015 Bassett
9,119,342 B2 9/2015 Bonefas
9,137,938 B2 9/2015 Zimmerman
9,144,187 B2 9/2015 Bassett
9,144,189 B2 9/2015 Stoller

(56) References Cited

U.S. PATENT DOCUMENTS 9,167,740 B2 10/2015 Bassett
9,173,339 B2 11/2015 Sauder et al.
9,192,089 B2 11/2015 Bassett
9,213,905 B2 12/2015 Lange
9,226,440 B2 1/2016 Bassett
9,232,687 B2 1/2016 Bassett
9,265,191 B2 2/2016 Sauder et al.
9,288,937 B2 3/2016 Sauder et al.
9,301,438 B2 4/2016 Sauder et al.
9,332,689 B2 5/2016 Baurer
9,338,937 B2 5/2016 Sauder et al.
9,351,440 B2 5/2016 Sauder et al.
9,462,744 B2 10/2016 Isaacson
9,485,900 B2 11/2016 Connell
9,510,498 B2 12/2016 Tuttle et al.
9,523,496 B2 12/2016 Bingham
9,532,496 B2 1/2017 Sauder et al.
9,554,504 B2 1/2017 Houck
9,578,802 B2 2/2017 Radtke
9,585,301 B1 3/2017 Lund
9,629,304 B2 4/2017 Zielke
9,668,402 B2 6/2017 Hagny
9,675,004 B2 6/2017 Landphair et al.
9,681,601 B2 6/2017 Bassett
9,693,496 B2 7/2017 Tevs
9,699,958 B2 7/2017 Koch
9,708,791 B2 7/2017 Strutynsky
9,723,778 B2 8/2017 Bassett
9,746,007 B1 8/2017 stoller
9,750,174 B2 9/2017 Sauder et al.
9,752,596 B2 9/2017 Sauder
9,788,472 B2 10/2017 Bassett
9,801,332 B2 10/2017 Landphair
9,814,172 B2 11/2017 Achen et al.
9,848,522 B2 12/2017 Bassett
9,848,523 B2 12/2017 Sauder
9,854,733 B1 1/2018 Kile
9,879,702 B2 1/2018 stoller
9,955,623 B2 5/2018 Sauder et al.
9,968,033 B2 5/2018 Dunn
10,024,459 B1 7/2018 Friedlein
10,045,477 B2 8/2018 Hagny
10,064,322 B2 9/2018 Luc
10,091,926 B2 10/2018 Maro
10,104,830 B2 10/2018 heathcote
10,111,415 B2 10/2018 Kolb
10,143,128 B2 12/2018 Landphair et al.
10,231,376 B1 3/2019 Stanhope
10,257,973 B2 4/2019 Hubner
10,408,670 B2 * 9/2019 Holcomb ............... G01G 23/10
10,548,259 B2 2/2020 Heathcote
10,578,220 B2 3/2020 Musolf
10,609,857 B2 4/2020 Sauder
10,645,865 B2 5/2020 Bassett
10,821,829 B2 11/2020 Foster
10,842,143 B2 11/2020 Humpal
10,959,369 B2 3/2021 Sieling
11,051,505 B2 7/2021 Humpal
11,144,775 B2 10/2021 Ferrari
11,197,411 B2 12/2021 Bassett
11,202,404 B2 12/2021 Walter
11,212,954 B2 1/2022 Maeder
11,277,961 B2 3/2022 Campbell
11,612,096 B2 3/2023 Sivinski
11,622,494 B2 4/2023 Arnett et al.
11,672,195 B2 6/2023 Stoller
12,075,719 B2 9/2024 Strnad
12,158,388 B2 * 12/2024 Yelle ...................... G05G 9/047
2002/0056407 A1 5/2002 Milne
2002/0073678 A1 6/2002 Lucand
2002/0170476 A1 11/2002 Bogner et al.
2003/0005867 A1 1/2003 Richard
2003/0116068 A1 6/2003 Sauder et al.
2003/0183141 A1 10/2003 Bergere et al.
2004/0139895 A1 7/2004 Thompson et al.
2005/0109870 A1 5/2005 Krise
2005/0155536 A1 7/2005 Wendte
2005/0172873 A1 8/2005 Mayerle
2005/0263049 A1 12/2005 Summach
2005/0284350 A1 12/2005 Ptacek
2006/0071116 A1 4/2006 Quenneville
2006/0086295 A1 4/2006 Jensen
2007/0151492 A1 7/2007 Dillman
2007/0151824 A1 7/2007 Dillman
2008/0110382 A1 5/2008 Brockmeier
2008/0229986 A1 9/2008 Arksey
2008/0250993 A1 10/2008 Mariman et al.
2008/0257237 A1 10/2008 Friesen
2009/0056531 A1 3/2009 Jessen
2009/0056537 A1 3/2009 Jessen
2009/0112410 A1 4/2009 Shull
2010/0180808 A1 7/2010 Liu
2010/0192818 A1 8/2010 Garner
2010/0270043 A1 10/2010 Ankenman
2010/0319941 A1 12/2010 Peterson
2011/0027479 A1 2/2011 Reineccius
2011/0184597 A1 7/2011 Thomas
2011/0313575 A1 12/2011 Kowalchuk
2012/0042813 A1 2/2012 Liu et al.
2012/0046838 A1 2/2012 Landphair et al.
2012/0048159 A1 3/2012 Adams et al.
2012/0048160 A1 3/2012 Adams
2012/0151910 A1 6/2012 Sauder
2012/0186503 A1 7/2012 Sauder
2012/0261149 A1 10/2012 Schmidt
2012/0291680 A1 11/2012 Rylander
2012/0328372 A1 12/2012 Hawkes
2013/0032363 A1 2/2013 Curry et al.
2013/0126430 A1 5/2013 kenley
2013/0146700 A1 6/2013 Wigard
2013/0248212 A1 9/2013 Bassett
2013/0333601 A1 12/2013 Shivak
2014/0026748 A1 1/2014 Stoller
2014/0060869 A1 3/2014 Blunier
2014/0109808 A1 4/2014 Schilling
2014/0116735 A1 5/2014 Bassett
2014/0190712 A1 * 7/2014 Bassett .................. A01B 76/00
172/763
2014/0214284 A1 7/2014 Sauder et al.
2014/0216771 A1 8/2014 Bassett
2014/0238284 A1 8/2014 Kapphahn
2014/0262378 A1 9/2014 Connors
2014/0303854 A1 10/2014 Zielke
2014/0379230 A1 12/2014 Koch
2015/0028146 A1 1/2015 Tsukui
2015/0094916 A1 4/2015 Bauerer et al.
2015/0107501 A1 4/2015 Barton
2015/0176614 A1 6/2015 Stoller
2015/0195988 A1 7/2015 Radtke
2015/0264857 A1 9/2015 Achen
2015/0271986 A1 10/2015 Sauder
2015/0305229 A1 10/2015 Sauder
2015/0319919 A1 11/2015 Sauder
2016/0007521 A1 1/2016 Kusler
2016/0007524 A1 1/2016 kusler
2016/0040692 A1 2/2016 Stoller
2016/0128272 A1 5/2016 Sauder
2016/0143213 A1 5/2016 Kowalchuk
2016/0157412 A1 6/2016 Sauder
2016/0212932 A1 7/2016 Radtke
2016/0227700 A1 8/2016 Wendte
2016/0227701 A1 8/2016 Nelson
2016/0249525 A1 9/2016 Baurer et al.
2017/0000016 A1 1/2017 Prickel
2017/0013771 A1 1/2017 townsend
2017/0049044 A1 2/2017 Stoller
2017/0086347 A1 3/2017 Sauder
2017/0094889 A1 4/2017 Garner
2017/0112043 A1 4/2017 Nair
2017/0217715 A1 8/2017 Scott
2017/0223947 A1 8/2017 Gall
2017/0280616 A1 10/2017 Gervais
2017/0354079 A1 12/2017 Foster
2017/0357029 A1 12/2017 Lakshmanan

(56) References Cited

U.S. PATENT DOCUMENTS

| | | | | |
|---|---|---|---|---|
| 2017/0359941 | A1 | 12/2017 | Czapka | |
| 2017/0367252 | A1 | 12/2017 | Sakaguchi | |
| 2018/0013270 | A1 | 1/2018 | Jubeck | |
| 2018/0015490 | A1 | 1/2018 | grimm | |
| 2018/0024549 | A1 | 1/2018 | Hurd | |
| 2018/0092287 | A1 | 4/2018 | Garner | |
| 2018/0092288 | A1 | 4/2018 | Garner | |
| 2018/0092289 | A1 | 4/2018 | Wonderlich | |
| 2018/0092295 | A1 | 4/2018 | Sugumaran | |
| 2018/0125000 | A1 | 5/2018 | Levy | |
| 2018/0128933 | A1 | 5/2018 | Koch | |
| 2018/0132422 | A1 | 5/2018 | Hassanzadeh et al. | |
| 2018/0132423 | A1 | 5/2018 | Rowan | |
| 2018/0168094 | A1 | 6/2018 | Koch | |
| 2018/0199499 | A1 | 7/2018 | Adams | |
| 2018/0199505 | A1 | 7/2018 | Beaujot | |
| 2018/0206393 | A1 | 7/2018 | Stoller | |
| 2018/0210443 | A1 | 7/2018 | Matsuzaki | |
| 2018/0263174 | A1 | 9/2018 | Hodel | |
| 2018/0292339 | A1 | 10/2018 | Gunzenhauser | |
| 2018/0317380 | A1 | 11/2018 | Bassett | |
| 2018/0317381 | A1 | 11/2018 | Bassett | |
| 2018/0368310 | A1 | 12/2018 | Zimmerman | |
| 2018/0373264 | A1 | 12/2018 | Madsen | |
| 2019/0021211 | A1 | 1/2019 | Gutknecht | |
| 2019/0029165 | A1 | 1/2019 | Leimkuehler et al. | |
| 2019/0045703 | A1 | 2/2019 | Bassett | |
| 2019/0059206 | A1 | 2/2019 | Stanhope | |
| 2019/0072114 | A1 | 3/2019 | Myers et al. | |
| 2019/0075714 | A1 | 3/2019 | Koch | |
| 2019/0124824 | A1 | 5/2019 | Hubner | |
| 2019/0162164 | A1 | 5/2019 | Funk | |
| 2019/0174666 | A1 | 6/2019 | Mantemach | |
| 2019/0191622 | A1 | 6/2019 | Hafvenstein | |
| 2019/0232304 | A1 | 8/2019 | Grimm | |
| 2019/0239413 | A1 | 8/2019 | DeGarmo | |
| 2019/0254223 | A1 | 8/2019 | Eichhorn | |
| 2019/0254225 | A1 | 8/2019 | Gilbert | |
| 2019/0286915 | A1 | 9/2019 | Patil | |
| 2019/0289778 | A1 | 9/2019 | Koch | |
| 2019/0297769 | A1 | 10/2019 | Zielke et al. | |
| 2019/0297774 | A1 | 10/2019 | Hamilton | |
| 2019/0302799 | A1 | 10/2019 | Schaff | |
| 2019/0373801 | A1 | 12/2019 | Schoeny | |
| 2019/0380259 | A1 | 12/2019 | Frank | |
| 2019/0387662 | A1 | 12/2019 | Viriat | |
| 2020/0029486 | A1 | 1/2020 | Buehler et al. | |
| 2020/0045869 | A1 | 2/2020 | Stanhope | |
| 2020/0053954 | A1 | 2/2020 | Hamilton | |
| 2020/0068778 | A1 | 3/2020 | Schoeny | |
| 2020/0068783 | A1 | 3/2020 | Strnad | |
| 2020/0080283 | A1 | 3/2020 | Shin | |
| 2020/0084951 | A1 | 3/2020 | Fanshier | |
| 2020/0100418 | A1 | 4/2020 | Komecki | |
| 2020/0100419 | A1 | 4/2020 | Stanhope | |
| 2020/0100421 | A1 | 4/2020 | Wang | |
| 2020/0100423 | A1 * | 4/2020 | Dienst | A01C 5/066 |
| 2020/0109954 | A1 | 4/2020 | Li | |
| 2020/0128723 | A1 | 4/2020 | Eichhorn | |
| 2020/0154627 | A1 | 5/2020 | Plattner | |
| 2020/0154629 | A1 | 5/2020 | Holoubek et al. | |
| 2020/0178455 | A1 | 6/2020 | Ishikawa | |
| 2020/0217044 | A1 | 7/2020 | Martel | |
| 2020/0221630 | A1 | 7/2020 | Pomedli | |
| 2020/0296882 | A1 | 9/2020 | Madison | |
| 2020/0305335 | A1 | 10/2020 | Schoeny | |
| 2020/0329631 | A1 | 10/2020 | Johnson | |
| 2020/0337218 | A1 | 10/2020 | Puhalla | |
| 2020/0352088 | A1 | 11/2020 | Arnett | |
| 2020/0359559 | A1 | 11/2020 | Koch | |
| 2020/0375081 | A1 | 12/2020 | Holoubek | |
| 2020/0375085 | A1 | 12/2020 | Strnad | |
| 2020/0375090 | A1 | 12/2020 | Morgan | |
| 2021/0022286 | A1 | 1/2021 | Gilbert et al. | |
| 2021/0051846 | A1 | 2/2021 | Vandenbark | |
| 2021/0059102 | A1 | 3/2021 | Geistkemper | |
| 2021/0120726 | A1 | 4/2021 | Barrick | |
| 2021/0132618 | A1 | 5/2021 | Van Roekel | |
| 2021/0153421 | A1 | 5/2021 | Holoubek et al. | |
| 2021/0161060 | A1 | 6/2021 | Kaufmann | |
| 2021/0185903 | A1 | 6/2021 | Demiter et al. | |
| 2021/0235611 | A1 | 8/2021 | Fett | |
| 2021/0243939 | A1 | 8/2021 | Strnad | |
| 2021/0243941 | A1 | 8/2021 | Buehler | |
| 2021/0289707 | A1 | 9/2021 | Schloesser | |
| 2021/0307236 | A1 | 10/2021 | Strnad | |
| 2021/0315147 | A1 | 10/2021 | Fanshier | |
| 2021/0329838 | A1 | 10/2021 | Zielke | |
| 2022/0000008 | A1 | 1/2022 | Hubner | |
| 2022/0061202 | A1 | 3/2022 | Holoubek et al. | |
| 2022/0061208 | A1 | 3/2022 | Campbell et al. | |
| 2022/0142039 | A1 | 5/2022 | Eichhorn et al. | |
| 2022/0151138 | A1 | 5/2022 | Barry | |
| 2022/0174855 | A1 | 6/2022 | Zielke et al. | |
| 2022/0232753 | A1 | 7/2022 | Van De Woestyne | |
| 2022/0272888 | A1 | 9/2022 | Hodel | |
| 2022/0369534 | A1 | 11/2022 | Nikolakakis | |
| 2023/0067038 | A1 | 3/2023 | Riemersma et al. | |
| 2023/0145955 | A1 | 5/2023 | Schmidt et al. | |
| 2023/0180653 | A1 | 6/2023 | Barry et al. | |
| 2023/0232733 | A1 | 7/2023 | Barry et al. | |
| 2023/0270039 | A1 | 8/2023 | Fanshier | |
| 2023/0388458 | A1 | 11/2023 | Eichhorn et al. | |
| 2023/0413720 | A1 | 12/2023 | Barry et al. | |
| 2024/0167848 | A1 | 5/2024 | Johnson | |
| 2024/0180066 | A1 | 6/2024 | Holoubek | |
| 2024/0268258 | A1 | 8/2024 | Eichhorn | |
| 2024/0334864 | A1 | 10/2024 | Holoubek et al. | |
| 2025/0133977 | A1 | 5/2025 | Barry et al. | |
| 2025/0348988 | A1 | 11/2025 | Eichhorn | |
| 2025/0367695 | A1 | 12/2025 | Wilson | |
| 2026/0056032 | A1 | 2/2026 | Roe | |
| 2026/0107935 | A1 | 4/2026 | Westbrook | |
| 2026/0137023 | A1 | 5/2026 | Howard | |
| 2026/0231864 | A1 | 8/2026 | Zielke | |
| 2026/0236114 | A1 | 8/2026 | Fulker | |

FOREIGN PATENT DOCUMENTS

| | | | | | |
|---|---|---|---|---|---|
| AU | 2017382800 | B2 | | 6/2018 | |
| AU | 2018100865 | B4 | | 6/2022 | |
| CA | 2346724 | A1 | | 4/2000 | |
| CA | 2549371 | A1 | | 11/2007 | |
| CA | 2584736 | A1 | | 9/2008 | |
| CA | 2727188 | A1 | | 12/2009 | |
| CN | 108362267 | A | | 8/2018 | |
| CN | 110667889 | A | * | 1/2020 | B64G 1/1021 |
| CN | 112601450 | A | | 4/2021 | |
| DE | 202005007450 | U1 | * | 7/2005 | F16C 19/18 |
| EP | 372901 | A2 | | 6/1990 | |
| EP | 606541 | A1 | | 1/1997 | |
| EP | 3219186 | A1 | | 9/2017 | |
| EP | 2901838 | B1 | | 11/2017 | |
| EP | 3698615 | A1 | | 8/2020 | |
| GB | 18381 | A | | 10/1904 | |
| GB | 2309622 | A | | 6/1997 | |
| JP | 4517467 | B2 | | 8/2010 | |
| KR | 20040029905 | A | | 4/2004 | |
| KR | 20080044756 | A | | 5/2008 | |
| KR | 101728137 | B1 | | 4/2017 | |
| RU | 2355152 | C2 | | 5/2009 | |
| SU | 948316 | A1 | | 8/1982 | |
| SU | 1148582 | A | | 4/1985 | |
| WO | 2009134144 | A1 | | 11/2009 | |
| WO | 2014153157 | A1 | | 9/2014 | |
| WO | 2015171908 | A1 | | 11/2015 | |
| WO | 2017160860 | A1 | | 9/2017 | |
| WO | 2017197274 | A1 | | 11/2017 | |
| WO | 2017197292 | A1 | | 11/2017 | |
| WO | 2018151989 | A1 | | 8/2018 | |
| WO | 2019164919 | A1 | | 8/2019 | |
| WO | WO-2020012369 | A2 | * | 1/2020 | G01N 21/78 |

(56) References Cited

FOREIGN PATENT DOCUMENTS

| | | | |
|---|---|---|---|
| WO | 2020049467 | A1 | 3/2020 |
| WO | 2021021594 | A1 | 2/2021 |
| WO | 2021231159 | A1 | 11/2021 |

OTHER PUBLICATIONS

Crary—http://www.crary.com/Products/Crary_Water_Solutions/Tile-PRO-Plow.
Ditch Witch—https://www.ditchwitch.com/trenchers/quad/rt120-quad.
French, Henry F. Farm drainage: the principles, processes, and effects of draining land with stones, wood, plows, and open ditches, and especially with tiles. New York: Orange Judd & Company, 1859.
Great Plains—Twin-Row planter.
Great Plains Planter—Photos.
John Blue—John Blue Peristaltic Pump—http://www.cds-johnblue.com/pumps/ground-driven/squeeze-tube-pumps/squeeze-tube-pump.shtml.
John Deere—MaxEmerge2 row unit.
John Deere—Row Crop Planter.
John Deere—XP row unit.
John Deere AG Management Solution, The payoff from precision, on farm network conferece, Feb. 20, 2008, Scheman Building, Ames IA.
John Deere, GreenStar 2 AutoTrac RowSense Quick Reference Guide.
Johnson—http://www.johnsonplows.com/products/pull-typle-plows/—Date Unknown, available as early as 2013.
Kinze—row crop planter with interplant row units.
Kinze—Row Planter.
Kinze Manufacturing—Tru Count Row Unit.
Liebrecht—http://farmdrainage.com/tile-plow/.
Momsem, Inc.—The Precision Vacuum Planter Documentation and pictures.
Oconnell—https://www.oconnelldrainage.com/.
Soil Max—http://soilmax.com/.
White 8000 Series Planter—Lift Wheels, Date Unknown—available as early as 2012, https://www.youtube.com/watch?v=tr1TPX5LRQA.
Uncooled LWIR Microbolometer Sensors—https://www.exosens.com/technologies/longwave-infrared-technology.
Laser Focus World—https://www.laserfocusworld.com/detectors-imaging/article/14177910/lwir-cameras-are-the-powerhouse-behind-thermal-imaging, 2020.
Li N, Zhao Y, Pan Q, Kong SG. Removal of reflections in LWIR image with polarization characteristics. Opt Express. Jun. 25, 2018;26(13):16488-16504. doi: 10.1364/OE.26.016488. PMID: 30119479.
Operating Manual for the Ag Leader Integra, Part No. 4002083, p. 130 of version 5.2, Date Unknown—available as early as 2024.
360 Yield Sensor—Wave—Date Unknown, available as early as 2020.
8910 Floating Hitch Cultivator, Date Unknown, available as early as 2010—https://www.bourgault.com/en-us/products/tillage/8910-cultivator.
Boss 18 Metre Parallelogram Tyne Planter—https://www.thecombineforum.com/threads/boss-18-metre-parallelogram-tyne-planter-on-9-spacing.222722/, Date Unknown, available as early as 2010.
Contour King Gallery—ZML, Date Unknown, available as early as 2013.
Dawn ACS Explanation video, https://twitter.com/DawnEquipment/status/969698839409111045.
Deere "SeedStar 2 Deere SeedStar XP Monitor for Planters" pp. 70-78-70-9.
Enfield Technologies, EQV Proportional Pinch Valves, https://www.enfieldtech.com/Products/EQV-Proportional-Pinch-Valves.
Farm Equipment—ZML.
Ground Breaker Precision Planters and Patented Tyne and Disc Row Units—https://www.precisionagsolutions. 9 com.au/ground-breaker.
Industrial Electronics Robust control of active suspensions for high performance vehicles, Proceedings of IEEE International Symposium on Industrial Electronics, 1996.
Industrial electronics, modeling and force tracking control of hydraulic actuator for an active suspension system, 2006 1st IEEE Conference on Industrial Electronics and Applications, 2006.
Janke Australia, Date Unknown, available as early as 2017—https://www.janke.com.au/.
John Deere Delta Force Diagram.
Kasper, relationship between six years of corn yields and terrain attributes, ISU—Kaspar, Tom & Colvin, Thomas & 14 Jaynes, D.B. & Karlen, Douglas & James, David & Meek, David & Pulido, Daniel & Butler, Howard. (2003). Relationship Between Six Years of Corn Yields and Terrain Attributes. Precision Agriculture. 4. 87-101.
Gratton et al, Manitoba, Design of a spring-loaded downforce system for a no-till seed opener, 2003.
Zong-yi et al., Minesweeping Tank, Electrohydraulic System Using RBF Neural Network and Genetic Algorithm, 2010.
Modular Row Crop Planting Systems from Excel Agriculture, Date Unknown, available as early as 2002—https://www.excelagr.com.au/excel-agri-row-crop-planter.php.
Orthman ItRIPr row unit, 2019—https://www.orthmanequip.com/strip-tillage/1tripr/.
Parallelogram Tyne Units—https://bossagriculture.com.au/home/planter-row-units/parallelogram-tyne-units/.
Patriot Parallelogram Tyne Planter Farm Equipment Gessner, available as early as 2017—https://www.gessner.com.au/products/patriot-parallelogram-tyne-planter/.
Precision Planting 2010 Full Line Brochure.
Precision Planting Furrowforce—https://precisionplanting.com/products/product/furrowforce.
Precision Planting FurrowJet, Date Unknown—available as early as 2017, https://precisionplanting.com/products/product/furrowjet.
Precision tyne planter takes innovation award, 2017, https://www.graincentral.com/machinery/precision-tyne-planter-takes-innovation-award.
What to Look for in a No Till or Minimum Tillage Planter—https://multifarmingsystems.com.au/wp-content/uploads/2015/07/What-to-Look-for-in-a-No-Till-or-Minimum-Tillage-Planter.pdf.
ZML Contour King, Youtube Video Aug. 13, 2021, https://www.youtube.com/watch?v=T-rj_EZMCM4.
Corteva—Improved Weed Control Using Soil-applied Herbicides Starts With Maps—Date Unknown, available as early as 2025, https://www.corteva.com/us/Resources/crop-protection/soybeans/weed-control-maps.html?cid=mkch%3Aeml_mktp%3Aelq_ctry%3Aus_brnd%3Acph_agny%25.

* cited by examiner

LOAD CELL BACKING PLATE AND ASSOCIATED DEVICES, SYSTEMS, AND METHODS

CROSS-REFERENCE TO RELATED APPLICATION(S)

This application claims the benefit under 35 U.S.C. § 119(e) to U.S. Provisional Application 63/303,114, filed Jan. 26, 2022, and entitled Load Cell Backing Plate, which is hereby incorporated herein by reference in its entirety for all purposes.

TECHNICAL FIELD

The disclosure relates to precision agriculture and, in particular, to high-speed planting.

BACKGROUND

High speed and precision farming technologies allow for maximization of yields and efficiency on many modern farms. Yet, these technologies can be expensive and cost prohibitive. As such, there is a need in the art for the ability to modify/retrofit existing planting implements into configurations that allow for utilizing high speed, precision farming.

BRIEF SUMMARY

Disclosed herein are various embodiments for a backing plate configured to be fitted on a row unit for supporting a load cell, in order to retrofit an existing row unit to be compliant with high-speed planting systems and precision agriculture.

In Example 1 a load cell adaptor comprising a first side, a second side comprising a seat, the seat shaped to be engaged with a load cell, and an opening shaped for insertion of a bolt therethrough, wherein the adaptor provides a consistent surface for mounting a load cell to on to a row unit.

Example 2 relates to the load cell adaptor of Example 1, further comprising at least one contact pad on the first side.

Example 3 relates to the load cell adaptor of any of Examples 1-2, further comprising three contacts pads on the first side.

Example 4 relates to the load cell adaptor of any of Examples 1-3, further comprising at least one alignment pin on the first side.

Example 5 relates to the load cell adaptor of any of Examples 1-4, further comprising two alignment pins on the first side disposed on opposing sides of the opening.

Example 6 relates to the load cell adaptor of any of Examples 1-5, further comprising a notch shaped within the first side.

Example 7 relates to the load cell adaptor of any of Examples 1-6, wherein the notch is a water drain.

In Example 8 an agricultural row unit comprising at least one gauge wheel, a load cell in communication with the at least one gauge wheel, and an adaptor for mounting the load cell onto the agricultural row unit, wherein the load cell is configured to measure an amount of ground contact found on the at least one gauge wheel. The adaptor comprising a first side, a second side comprising a seat, an opening centrally located in the seat, and one or more contact pads on the first side.

Example 9 relates to the agricultural row unit of Example 8, further comprising an adjustment bolt in communication with the at least one gauge wheel configured to adjust planting depth; wherein the adjustment bolt is inserted through the opening.

Example 10 relates to the agricultural row unit of any of Examples 8-9, further comprising one or more alignment pins disposed about the opening.

Example 11 relates to the agricultural row unit of any of Examples 8-10, wherein the one or more contact pads and the one or more alignment pins are in contact with the row unit.

Example 12 relates to the agricultural row unit of any of Examples 8-11, comprising three contact pads and two alignment pins.

Example 13 relates to the agricultural row unit of any of Examples 8-12, further comprising at least one notch within the second side configured to provide drainage.

Example 14 relates to the agricultural row unit of any of Examples 8-13, wherein the seat provides a planar contact surface for mounting the load cell.

Example 15 relates to the agricultural row unit of any of Examples 8-14, further comprising a handle adaptor for attaching a handle to the adjustment bolt.

Example 16 relates to the agricultural row unit of any of Examples 8-15, wherein the handle adaptor provides full contact loading of the load cell.

Example 17 relates to the agricultural row unit of any of Examples 8-16, wherein one or more contact pads are disposed on the first side of the adaptor such as to contact a flat portion of a shank of the agricultural row unit and adjacent to a tangent of a die formed radius of the shank.

Example 18 relates to the agricultural row unit of any of Examples 8-17, wherein the load cell is in communication with a row unit downforce system.

In Example 19 an adaptor for retro-fitting an agricultural row unit, comprising a body comprising a first side and a second side, an opening shaped to receive an adjustment bolt therethrough, three contact pads disposed on the first side of the body, two alignment pins disposed on the first side of the body, and a seat formed within the second side comprising a planar surface for engagement with a load cell.

Example 20 relates to the adaptor of Example 19, further comprising at least one notch in the second side.

While multiple embodiments are disclosed, still other embodiments of the disclosure will become apparent to those skilled in the art from the following detailed description, which shows and describes illustrative embodiments of the invention. As will be realized, the disclosure is capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1:
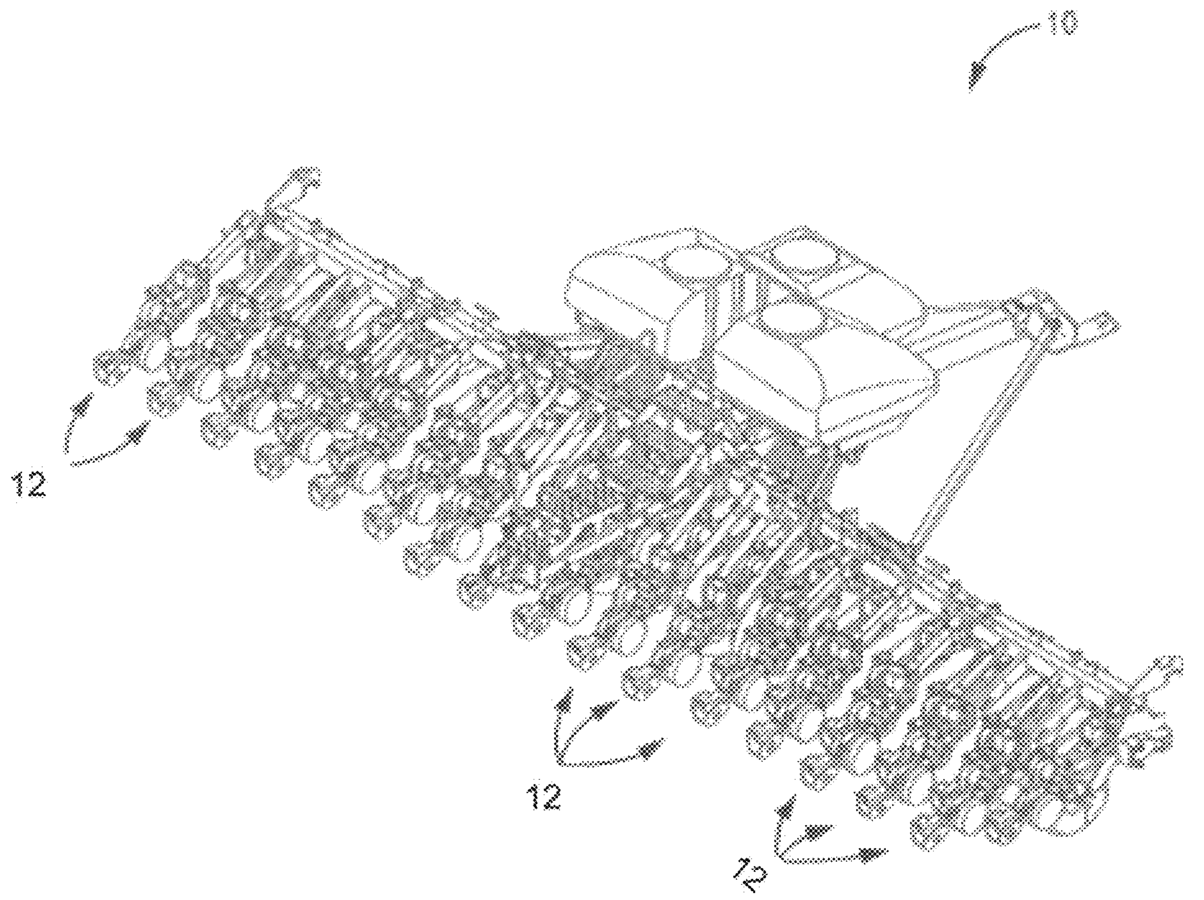
FIG. 1 is a perspective view of a planter, according to one implementation.
Figure 2:
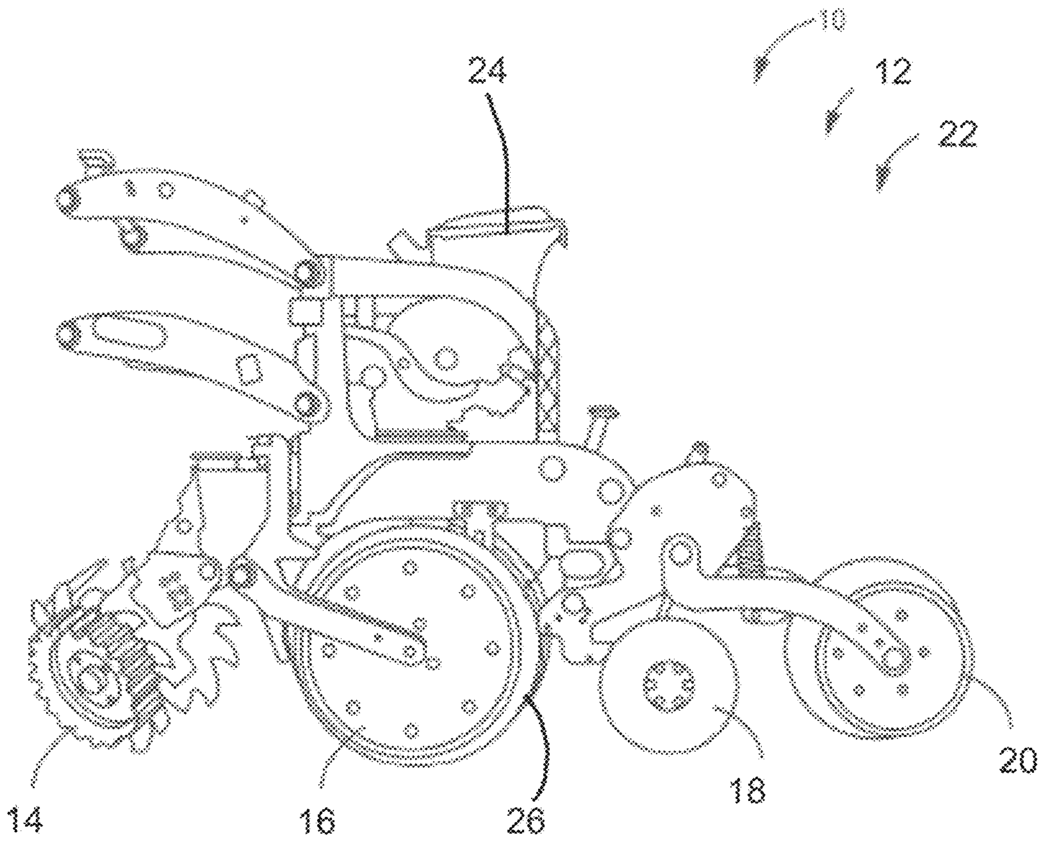
FIG. 2 is a side view of a row unit, according to one implementation.

Disclosed and contemplated herein are various plates and adaptors for mounting a load cell onto a planter row unit, and in some implementations an existing row unit not previously configured for high-speed planting. The various implementations disclosed herein allow for mounting a load cell in communication with one or more gauge wheels of a row unit for accurately measuring the amount of ground contact force on the gauge wheels during planting.

The ability to modify/retrofit an existing, traditional planter to be a precision, high-speed implement can be difficult, because the original equipment may not be designed for such modifications or designs. That is, in many instances high-speed and precision planting requires a high level of accuracy and precise data gathering for proper functioning of the systems, that is not possible with traditional equipment. When functioning properly, high speed, precision planting systems can increase overall yields and efficiency in farming operations.

For various high speed and precision planting systems, a precise measurement of the amount of ground contact force on the gauge wheels is necessary for adjustment and maintenance of the depth of the furrow. On traditional row units, the depth of the furrow is controlled by turning an adjustment bolt that is in tension when the row unit is actively planting. As would be understood, the gauge wheels set the planting depth by their position relative to the furrow opening blades. Turning of the adjustment bolt changes the relative positions of the gauge wheels and furrow opening blades and thereby changes the depth of the furrow.

To modify such a row unit for high-speed and precision planting, in various implementations, a compression type load cell is added to the depth adjusting mechanism to measure the amount of ground contact force present on the depth gauge wheels. In many implementations, the structure of an existing row unit provides an adequate structure to support the tension bolt but is not flat/uniform enough to consistently support the load cell required for modern precision farming technology. These variations in existing row unit structures are the cause of inconsistent loading. For example, the surface to which the load cell is mounted may be concave, or sometimes convex or planar. This variation in surface geometry results in load cell readings that vary across the many row units on a planter. Some load cells may read too high, some may read too low. This imprecise and inaccurate measurement of ground contact force may result in erratic control of a row unit downforce system that is necessary for control of a high-speed planter.

To resolve the problem, discussed herein is a backing plate/adaptor added to the row unit at the load cell attachment point. In various implementations, the backing plate/adaptor supports at least three points of contact on the row unit structure and is sufficiently rigid to support a compression type load cell and thereby provide consistent loading and allow for accurate and precise readings of ground contact force.

The backing plate, or adaptor, addresses the issues noted above by locating the load cell outward of the inconsistent surface and then providing a structure that is rigid enough to support the load cell independent of the base structure. Further, the adaptor may add structural strength without any changes required to the original components of the row unit. In further implementations, a handle mount is provided that maintains all of the features of the existing row unit and adds full contact loading to the load cell rather than line contact.

Turning to the figures in greater detail, in various implementations, the plate 30 (shown in detail in FIGS. 4A-9) may be implemented on any known planter 10 and row unit 12 configuration, as would be understood. As would be appreciated by those of skill in the art, planters 10 and row units 12 may be in myriad configurations and include various devices and systems. FIG. 1 depicts an exemplary planter 10 having a plurality of row units 12 constructed and arranged for planting row crops, such as corn.

It would be appreciated by those of skill in the art that planter row units 12 may have a variety of configurations including various devices, components, and systems implemented thereon. Exemplary row units 12 are shown in FIGS. 2 and 3A-C. The exemplary row unit 12 of FIG. 2 includes a row cleaner 14, gauge wheels 16, closing discs 18, and a press wheel 20. The row unit 12 also includes a seed handling system 22 and hopper 24 which are optionally configured for handling and depositing seeds in a furrow opened by opening discs 26 prior to closing by the closing discs 18. The operations of the row unit 12, planter 10, and various components thereof would be widely appreciated by those of skill in the art. It would be further appreciated that other row unit 12 configurations are possible.

Figure 3A:
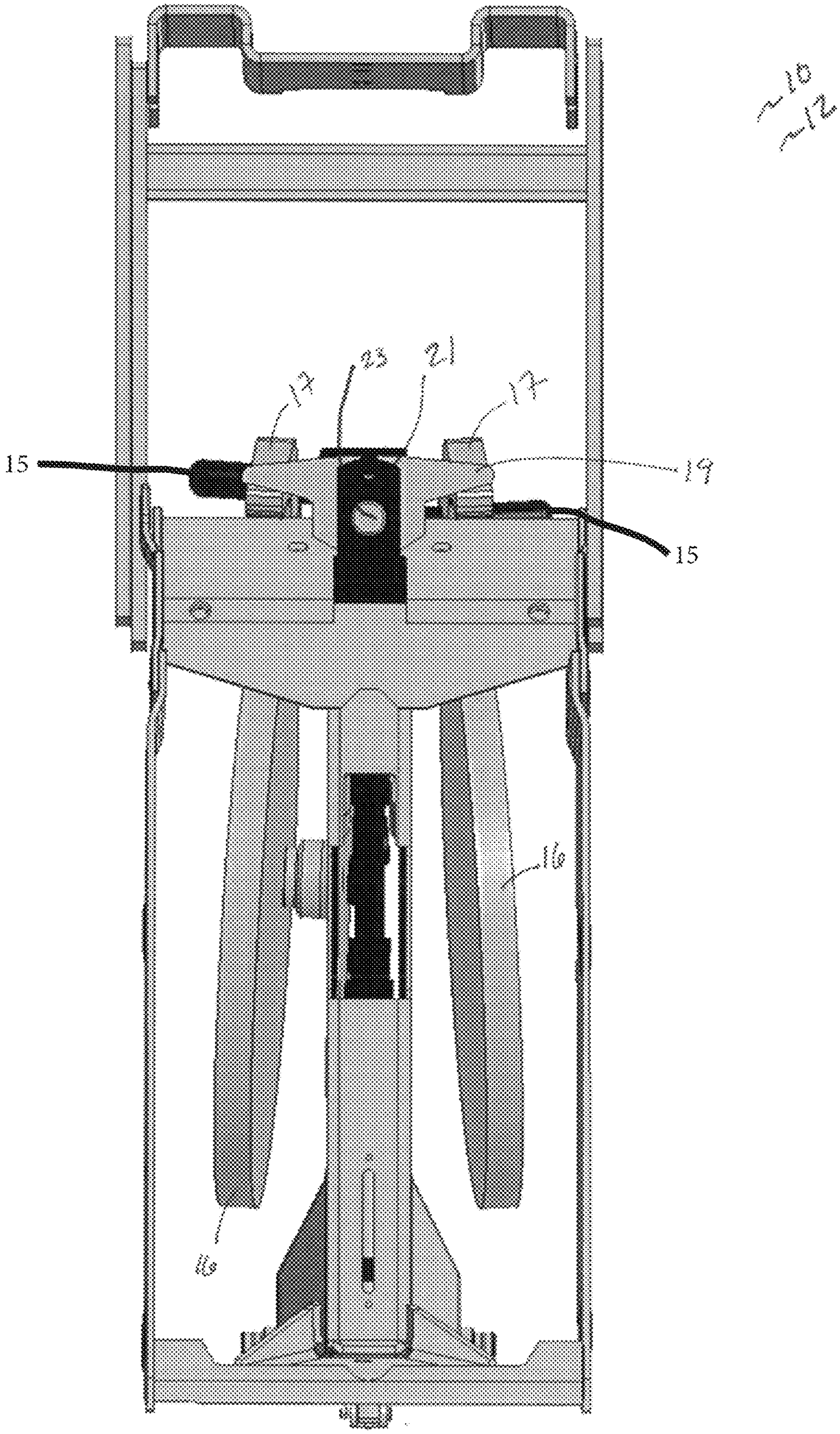
FIG. 3A is a top view of row unit, according to one implementation.
Figure 3B:
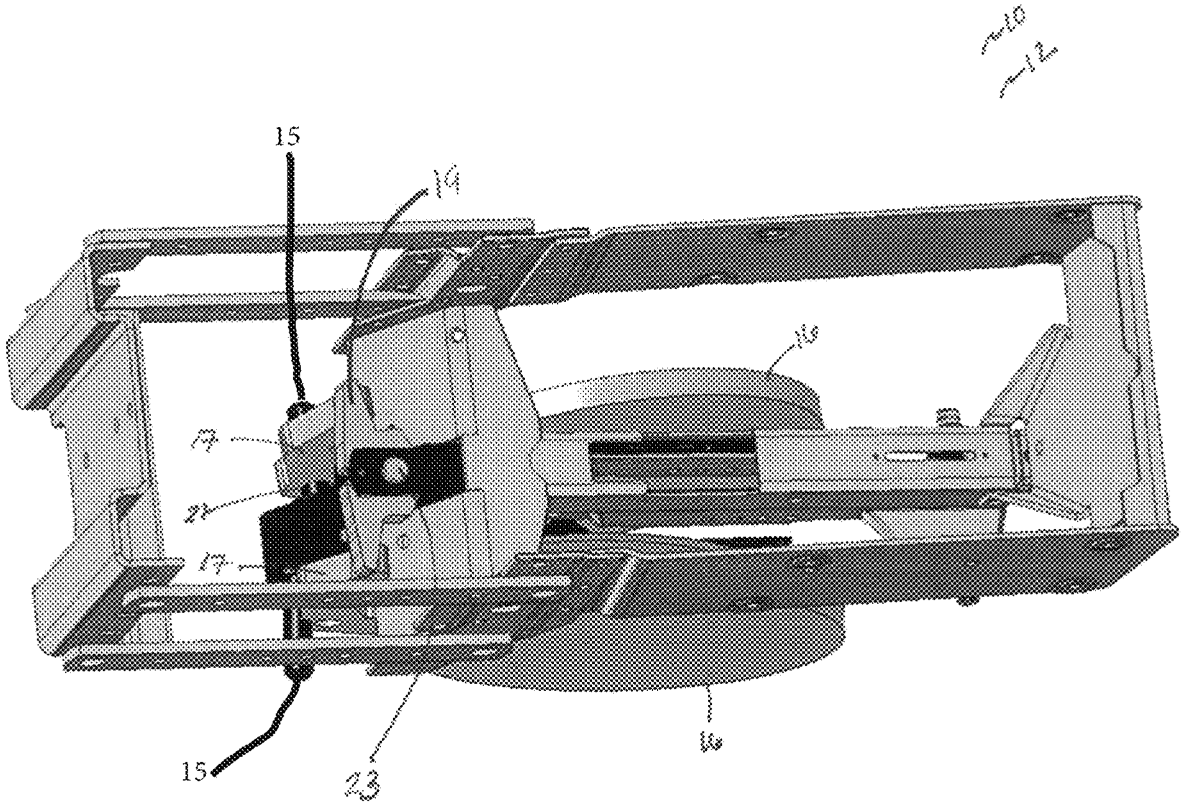
FIG. 3B is a top perspective view of a row unit, according to one implementation.
Figure 3C:
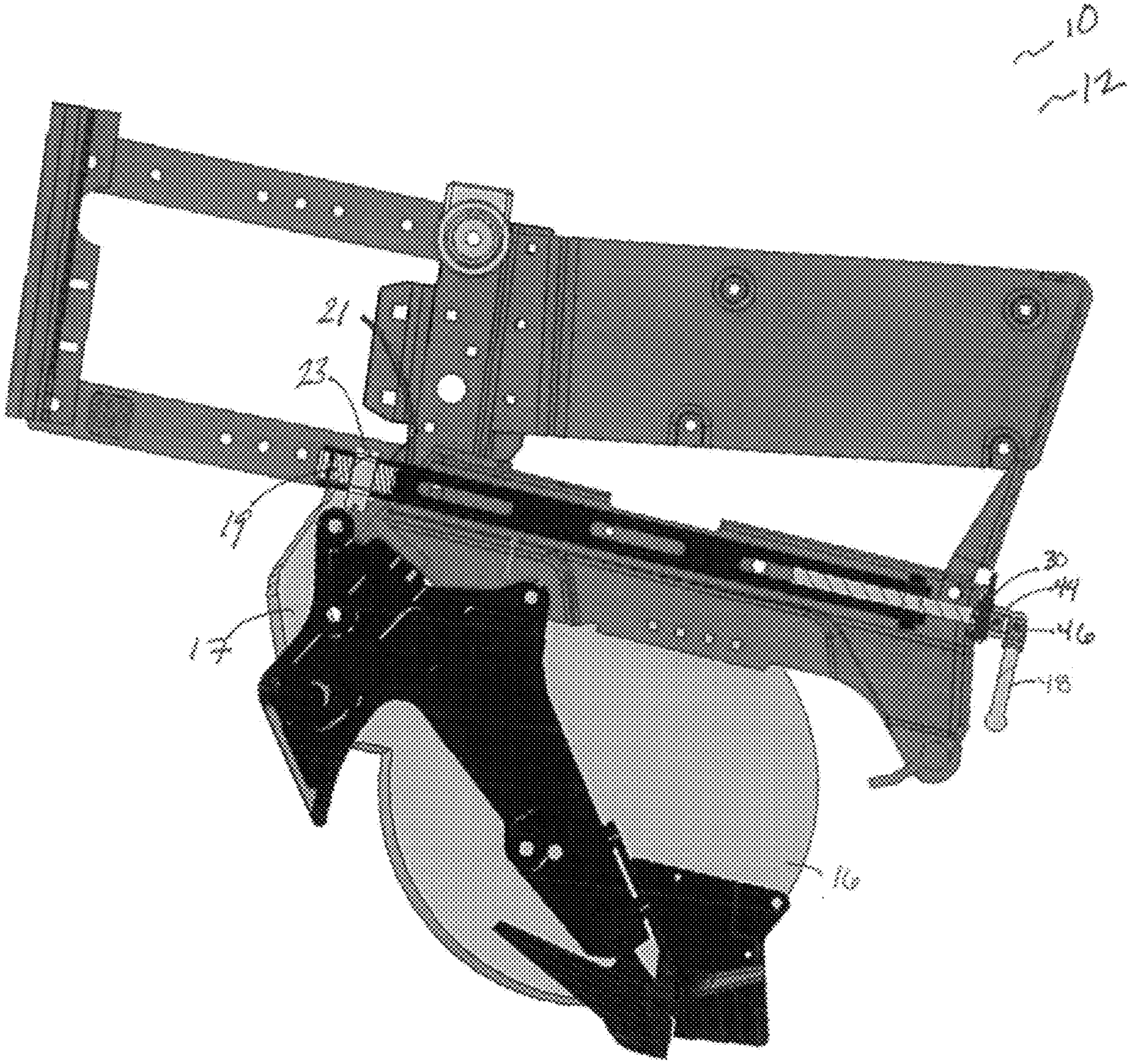
FIG. 3C is a side cross sectional view of a row unit, according to one implementation.

FIGS. 3A-C show a row unit 12 according to a further implementation. In these and other implementations, the gauge wheels 16 are attached to gauge wheel arms 17 that pivot on a shaft 15 attached to the main structure of the planting row unit 12. Weight applied to the gauge wheels 16 cause the gauge wheels 16 to rotate upwards about the main structure 12 pivot shaft 15 until a lever, that is part of the gauge wheel arm 17, contacts the surface of the gauge wheel tie plate 19. Upward force on the gauge wheel arms 17 produces forward force on the gauge wheel tie plate 19. The gauge wheel tie plate 19 is in turn attached to the depth adjustment tension frame 21 by a pivot pin 23. The pivoting motion of the gauge wheel tie plate 19 converts unequal motion of the gauge wheels 16 to constant tension in the depth adjustment tension frame 21.

FIGS. 4A-5B depict various views and implementations of the adaptor 30 for use with a load cell to measure the ground contact force on the gauge wheels. In various implementations, the adaptor 30 includes a first side 32 configured to face the body of the row unit 12, shown in FIGS. 4A and 4B. One or more contact pads 34 are disposed on the first side 32 and configured to facilitate the even placement of the adaptor 30 on the row unit 12. In various implementations, at least two or three contact pads 34 are provided. The contact pads 34 are adapted to concentrate compressive loading on the die formed area of the shank structure (shown generally at 60 in FIG. 6) of the row unit 12. In various implementations, certain of the contact pads 34 are located at or near or otherwise immediately adjacent to the tangent of the die formed radius of the shank 60 on a flat surface of the shank 60. That is, in certain of these implementations, contact pads 34 are configured to contact the shank 60 at a flat portion of the shank 60 immediately adjacent to the curved portion because, as would be appreciated by those of skill in the art, those region include the least variability due to the manufacturing/die-forming process. It would therefore be appreciated by those of skill in the art that placing the contact pads 34 near/adjacent to the formed radius of the shank 60 may be preferred as it is likely to provide the strongest connection while avoiding potential defects in underlying the metal of the row unit 12, thereby reducing variability. Further arrangements and configurations are of course contemplated and would be appreciated by the skilled artisan.

In certain implementations, one or more alignment pins 36 are provided on the same side 32 of the adaptor 30 has the contact pads 34 to prevent rotation of the adaptor 30. In certain implementations, two alignment pins 36 are disposed on the first side 32. In certain implementations, the pins 36 are disposed on opposite sides of the opening 42, discussed below. Various alternative numbers and locations of pins 36 are possible and would be appreciated by those of skill in the art. In various implementations, only the contact pads 34, and optionally pins 36, are in contact with the row unit 12.

Figure 4A:
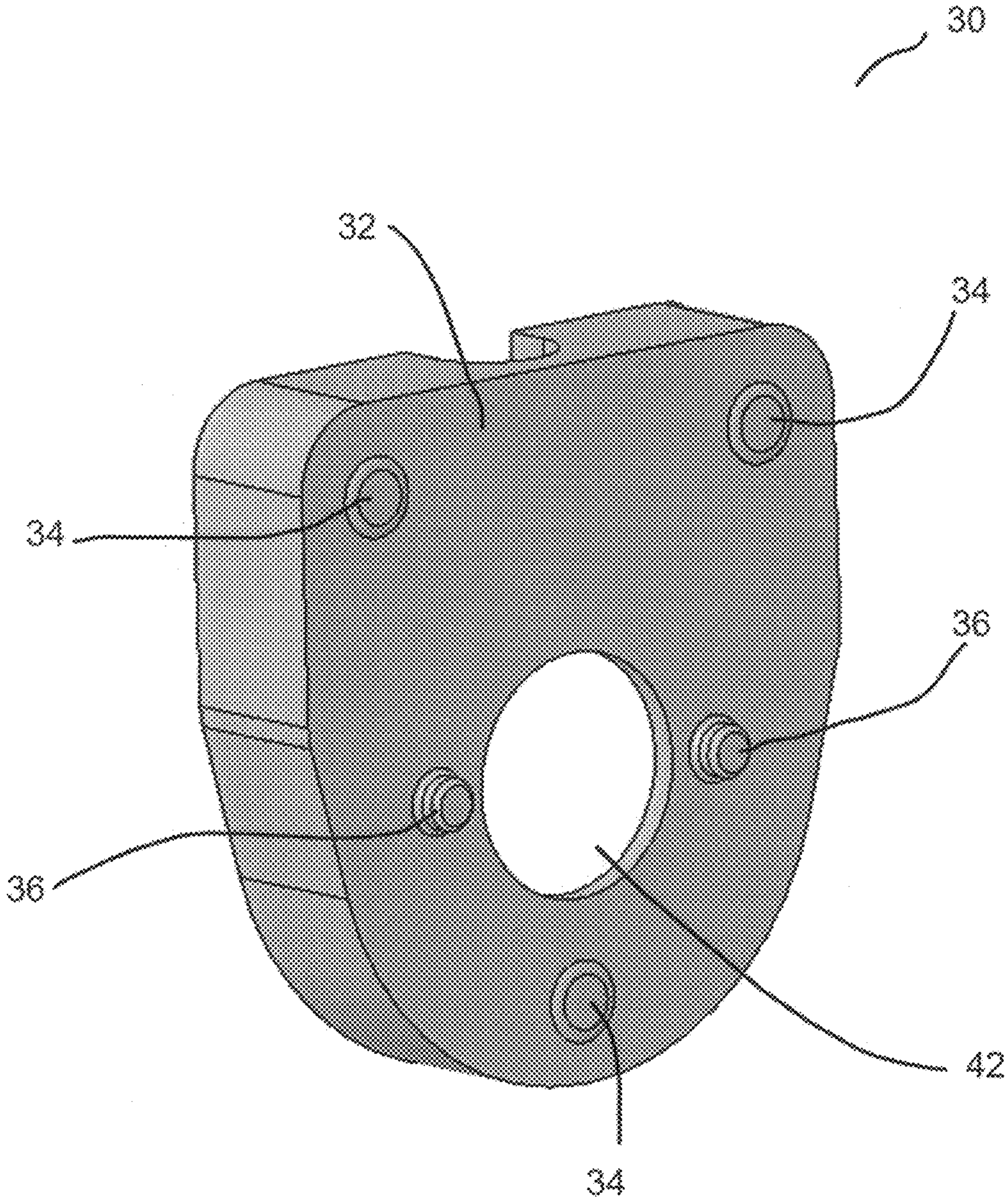
FIG. 4A is a rear view of an adaptor, according to one implementation.
Figure 4B:
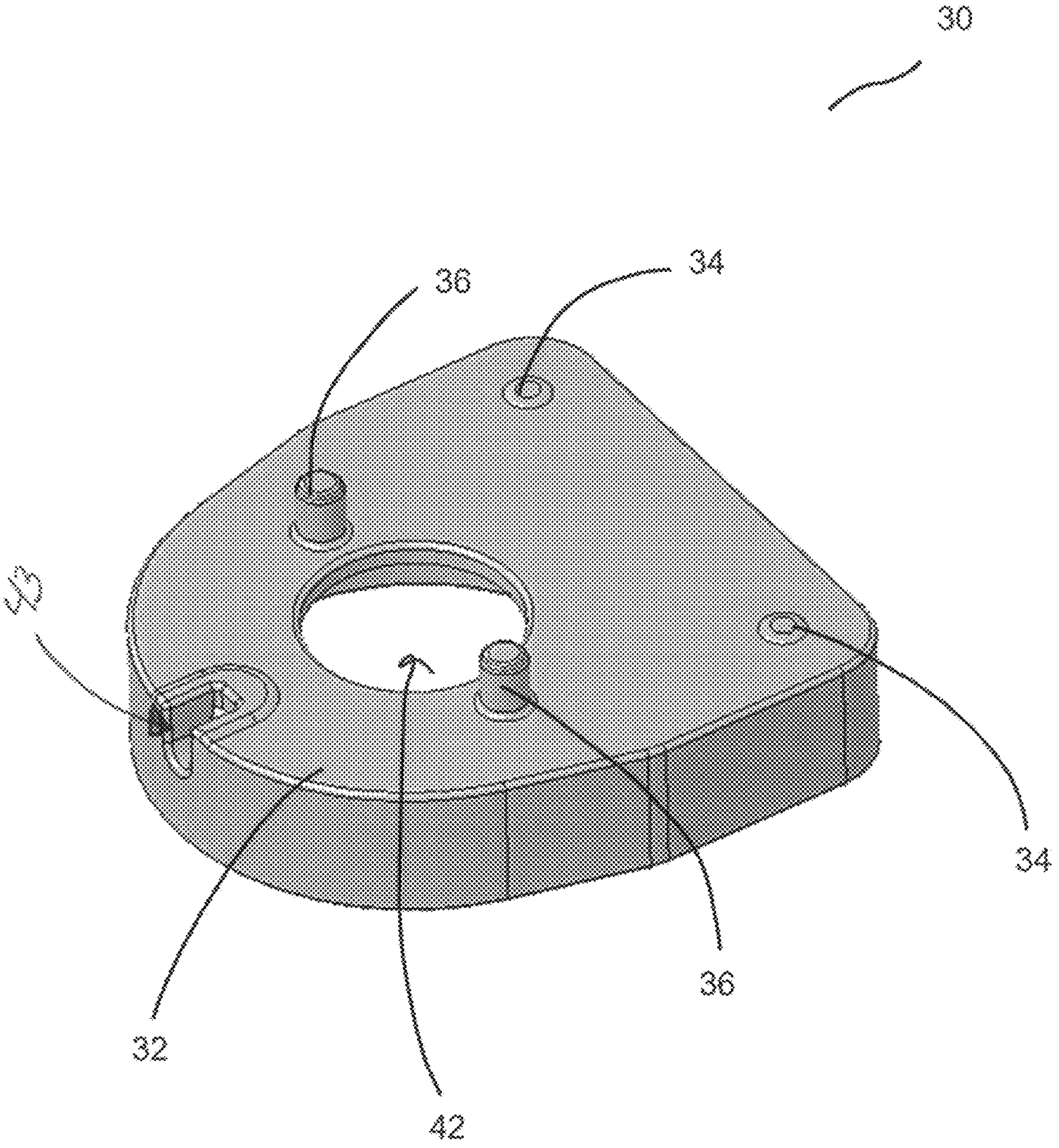
FIG. 4B is a rear perspective view of an adaptor, according to one implementation.

In certain additional implementations, shown for example in FIG. 4B, a notch 43 may be formed in a side 32 of the adaptor 30. In these and other implementations the notch 43 may act as a water drain because in certain configurations the adaptor 30 may be at an angle that collects water. This collection of water can affect the accuracy of the load cell and as such a notch 43 is provided to create a drain path such that water does not collect about the adaptor 30. In various further implementations the notch 43 an at as an ejection path for dust and dirt.

Figure 5A:
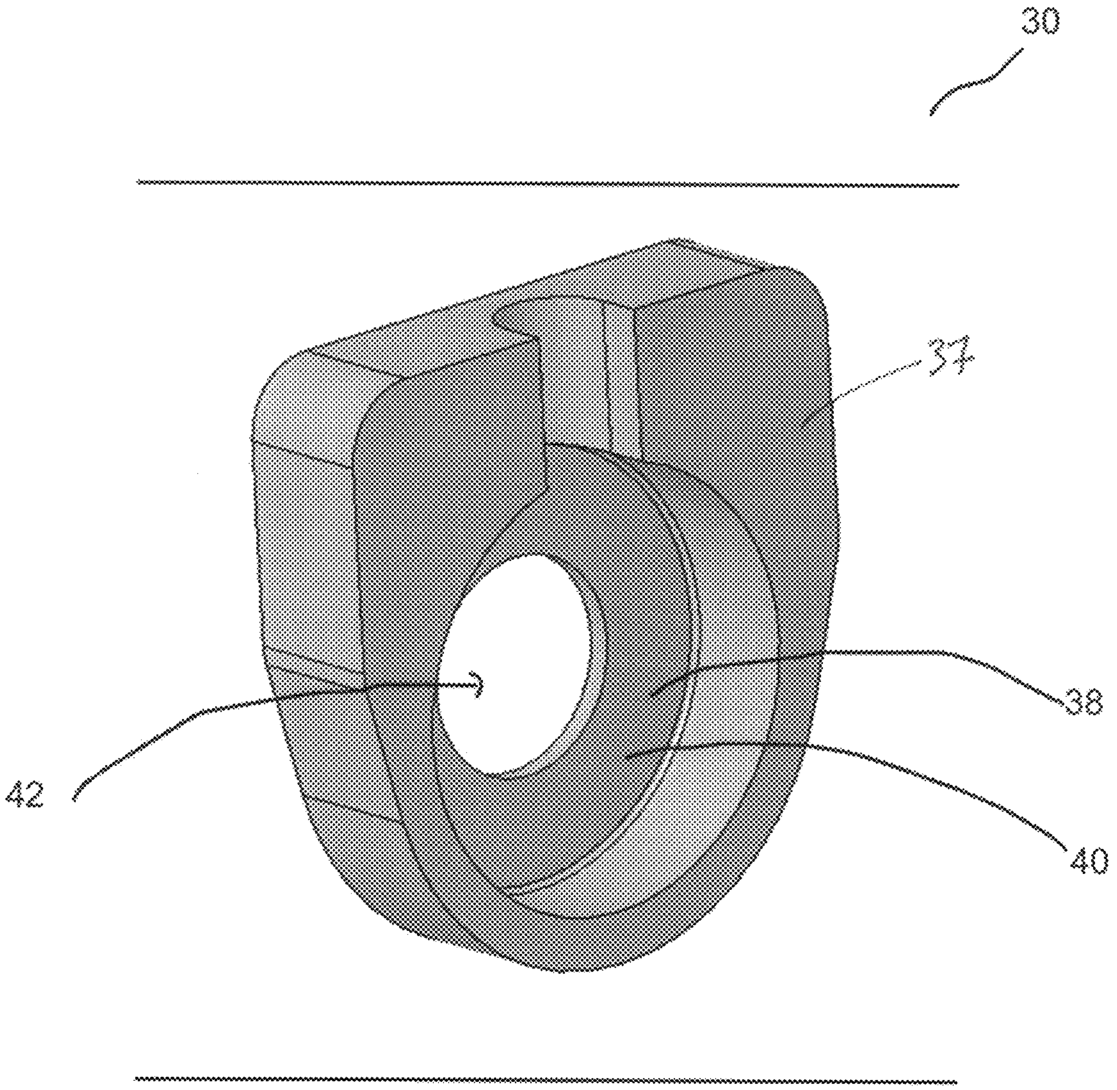
FIG. 5A is a front view of an adaptor, according to one implementation.
Figure 5B:
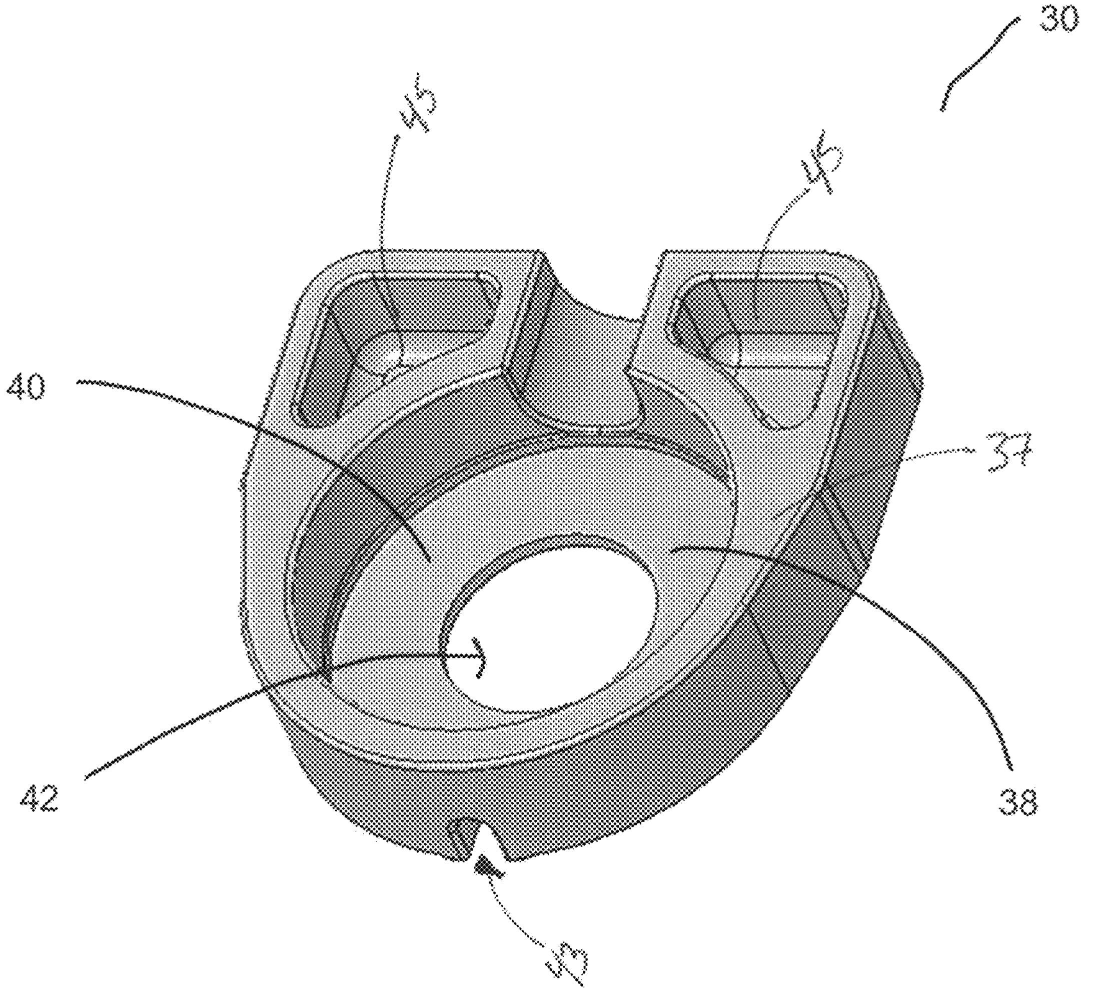
FIG. 5B is a front perspective view of an adaptor, according to one implementation.
Figure 6:
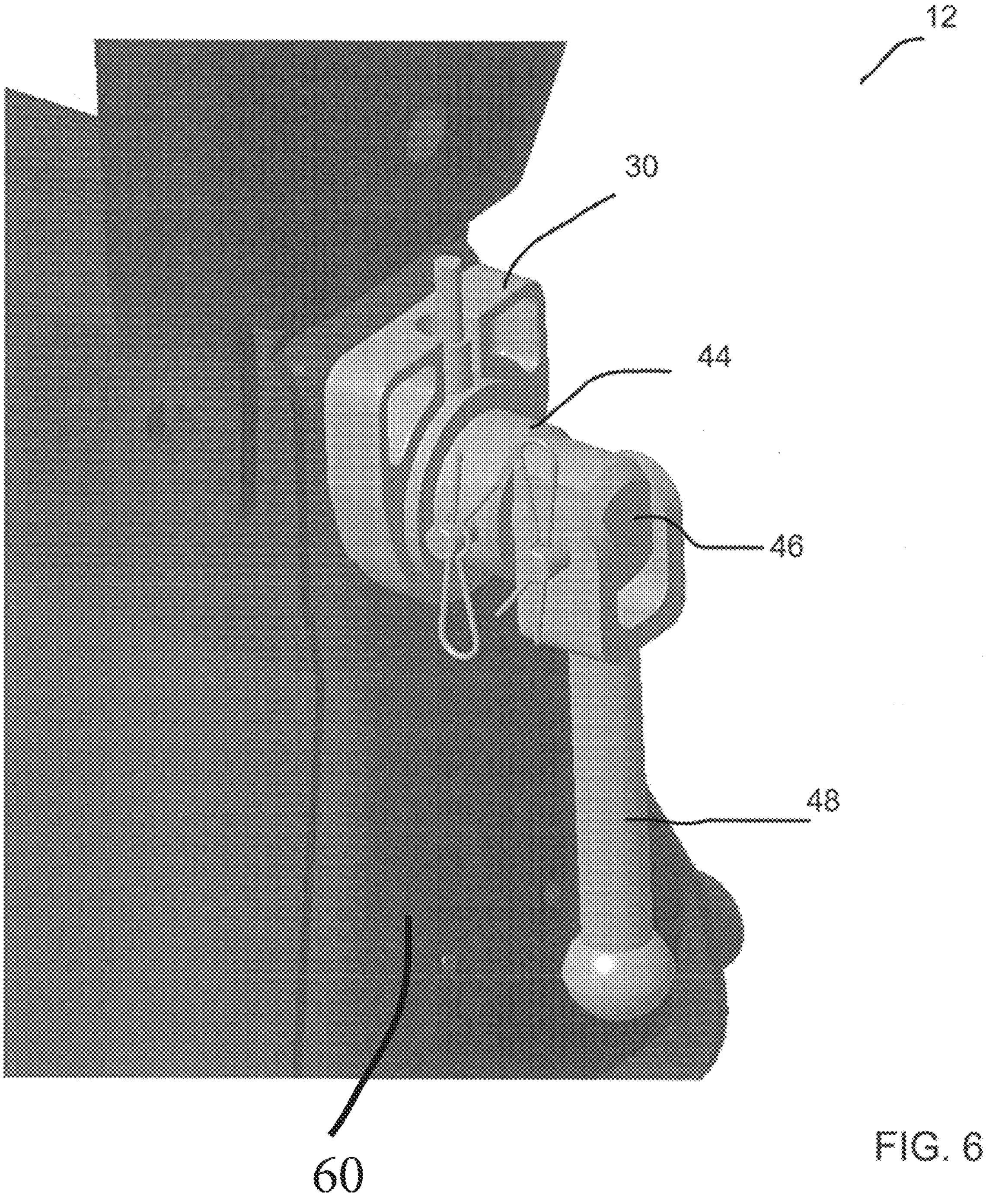
FIG. 6 is a perspective view of the adaptor installed on a row unit, according to one implementation.
Figure 7:
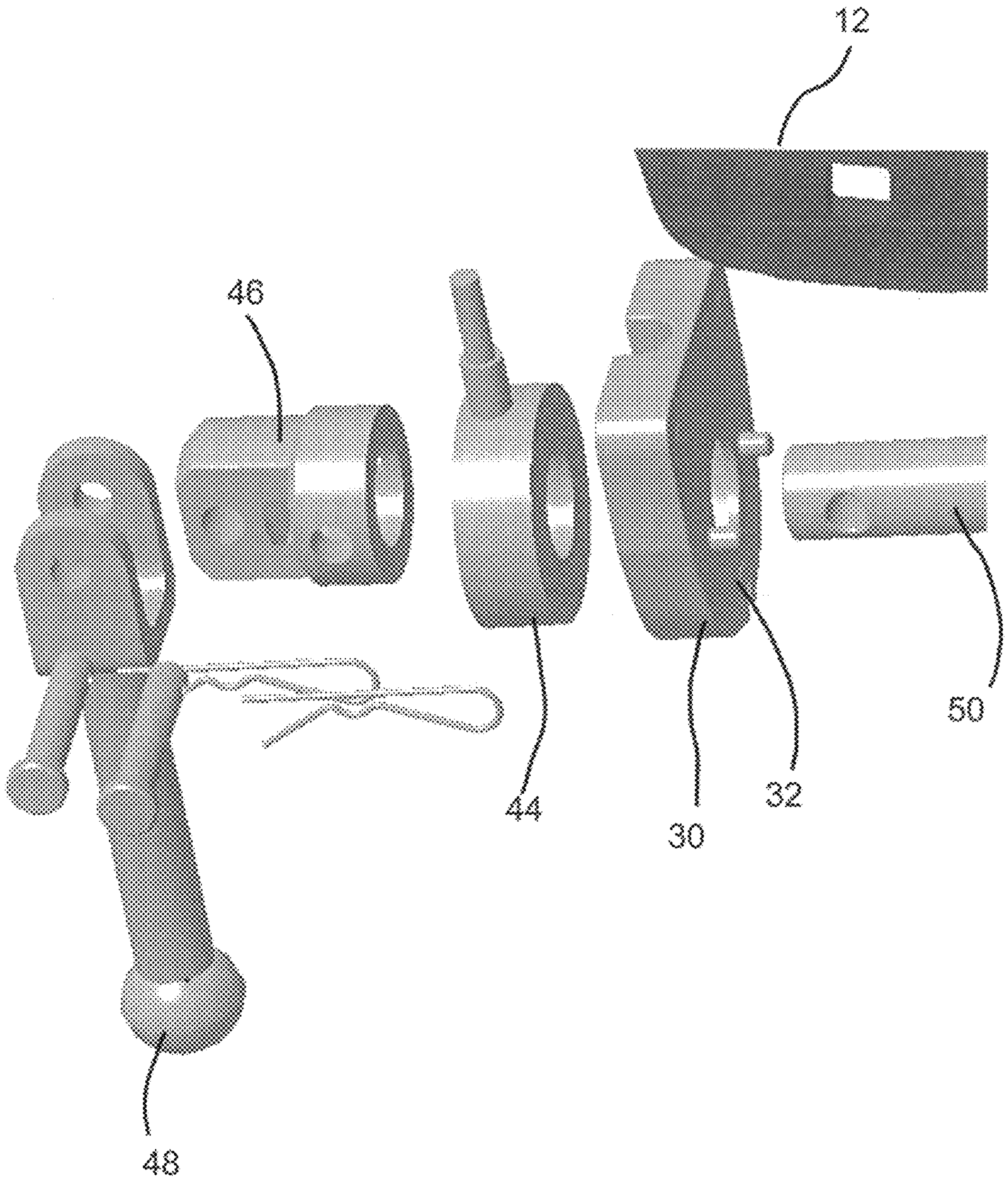
FIG. 7 is an exploded view of the adaptor and depth adjustment assembly, according to one implementation.
Figure 8:
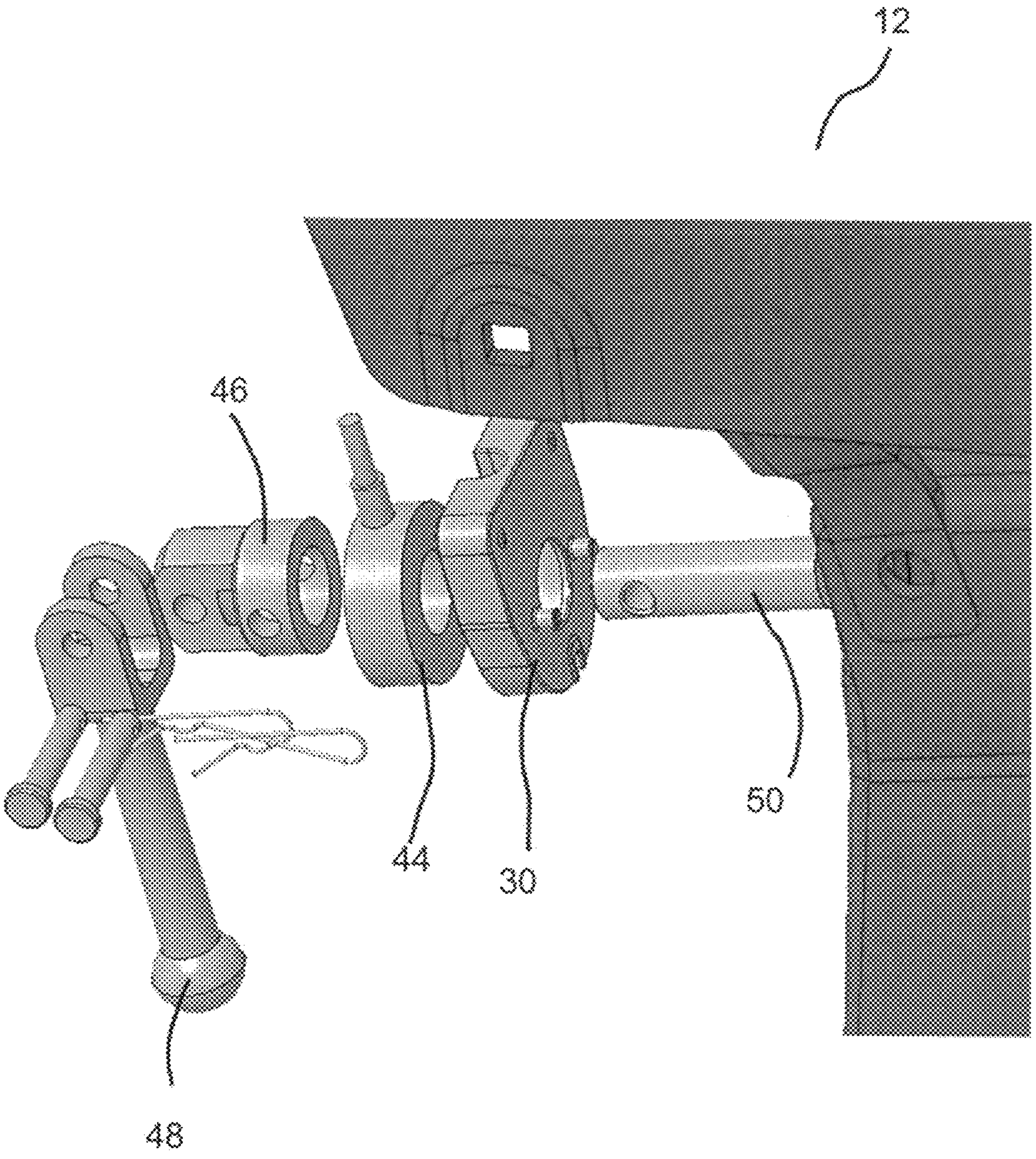
FIG. 8 is an exploded view of the adaptor and depth adjustment assembly, according to one implementation.
Figure 9:
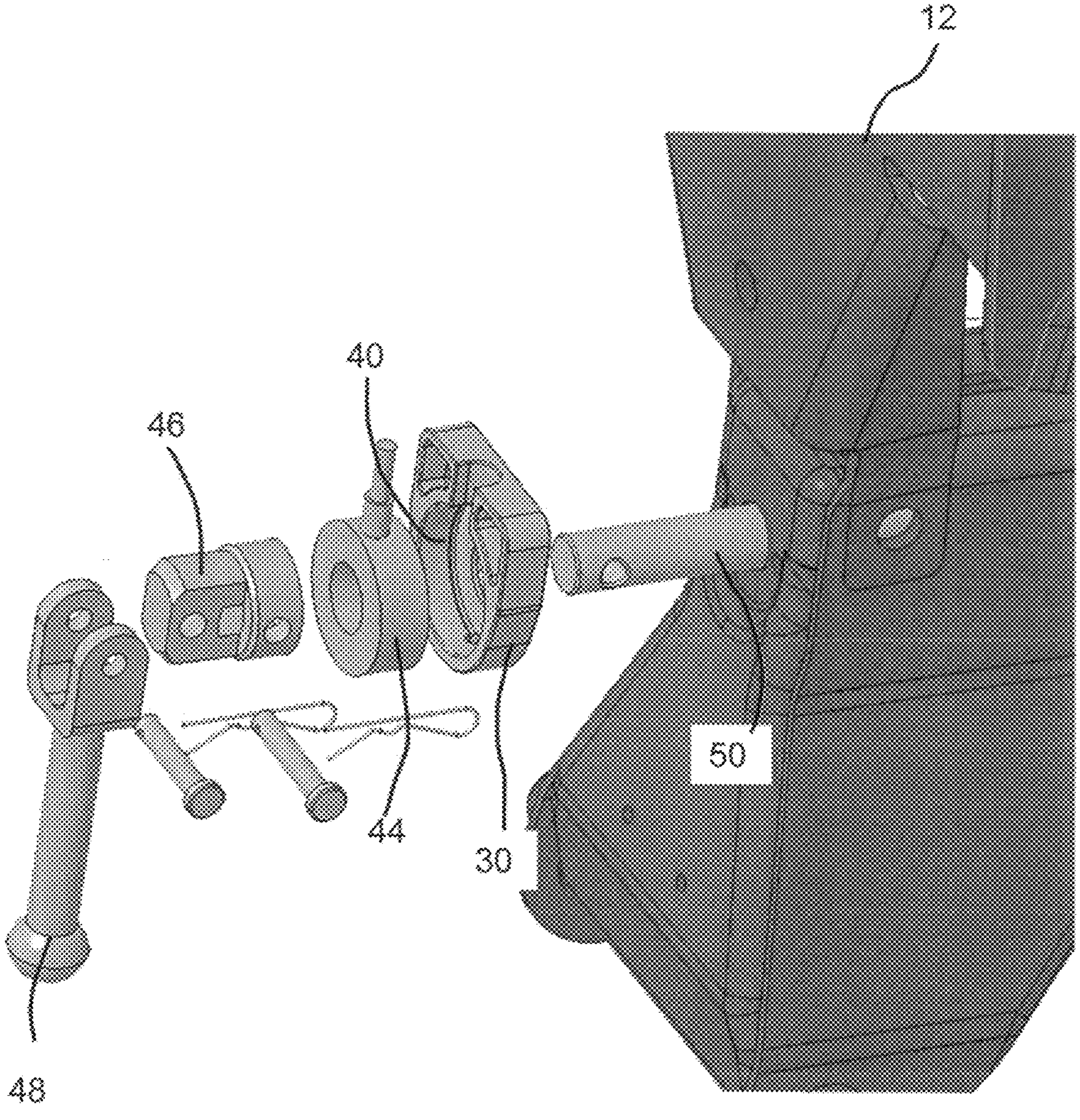
FIG. 9 is an exploded view of the adaptor and depth adjustment assembly, according to one implementation.

FIGS. 5A and 5B show the adaptor 30, from another side 37 having a contact surface 38 for engagement with a load cell. In various implementations, the contact surface 38 forms a seat 40 within the adaptor 30. That is, in various implementation, the seat 40 is recessed within the adaptor 30. In these implementations, an opening 42 is provided through the seat 40. The opening 42 shaped to be fitted around a tension bolt, as will be shown and described further below. The opening 42 may be centrally located within the seat 40. The seat 40 with the contact surface 38 provide a consistent planar surface, where a load cell may rest and provide precise and accurate readings.

In certain implementations, the adaptor 30 may include various depressions 45, cut-outs, or other features for material saving. For example, in FIG. 5B depressions 45 are shown that reduce material thickness and thereby material use in forming the adaptor 30. Various additional material saving features may be implemented, as would be understood. The adaptor 30 may be made from metal, stainless steel, ferrous steel, or any other appropriate material as would be appreciated.

FIGS. 6-9 show various views of the adaptor 30 in use and in communication with various additional components of a row unit 12. The adaptor 30 is configured such that one side 32 faces the row unit 12, with the contact pads 32, and optionally alignment pins 36, in contact with the row unit 12. A load cell 44 is fitted within the seat 40 on the second side 37 of the adaptor 30. The adaptor 30 also is fitted around the tension bolt 50 that is inserted through the opening 42.

In various implementations, the load cell 44 is a compression type load cell. Alternatively, the load cell may be a tension type load cell or beam type load cell, or other appropriate load cell type that would be appreciated by those of skill in the art.

In certain implementations, a handle adaptor 46 is provided for providing full contact loading to the load cell 44. The handle adaptor 46 is inserted along the tension bolt 50 and disposed between the load cell 44 and the handle 48. That is, the handle adaptor 46 acts as a spacer between the load cell 44 and the handle 48. The handle adaptor 46 provides a full circular contact area of compress on the load cell 44. This may be advantageous because line contact can lead to inaccurate readings by the load cell 44. Further, the handle adaptor 46 provides this contact while maintaining all the original depth adjustment features of the OEM handle. In various implementations, the handle 48 is attached to the adaptor 46 by one or more bolts and pins. Various alternative attachment mechanisms are possible and would be appreciated.

In various implementations, the tension bolt 50 and the handle 48 may be original equipment manufacturer parts or are otherwise traditional elements.

Certain of the disclosed implementations can be used in conjunction with any of the devices, systems or methods taught or otherwise disclosed in U.S. Pat. No. 10,684,305 issued Jun. 16, 2020, entitled "Apparatus, Systems and Methods for Cross Track Error Calculation From Active Sensors," U.S. patent application Ser. No. 16/121,065, filed Sep. 4, 2018, entitled "Planter Down Pressure and Uplift Devices, Systems, and Associated Methods," U.S. Pat. No. 10,743,460, issued Aug. 18, 2020, entitled "Controlled Air Pulse Metering apparatus for an Agricultural Planter and Related Systems and Methods," U.S. Pat. No. 11,277,961, issued Mar. 22, 2022, entitled "Seed Spacing Device for an Agricultural Planter and Related Systems and Methods," U.S. patent application Ser. No. 16/142,522, filed Sep. 26, 2018, entitled "Planter Downforce and Uplift Monitoring and Control Feedback Devices, Systems and Associated Methods," U.S. Pat. No. 11,064,653, issued Jul. 20, 2021, entitled "Agricultural Systems Having Stalk Sensors and/or Data Visualization Systems and Related Devices and Methods," U.S. Pat. No. 11,297,768, issued Apr. 12, 2022, entitled "Vision Based Stalk Sensors and Associated Systems and Methods," U.S. patent application Ser. No. 17/013, 037, filed Sept. 4, 2020, entitled "Apparatus, Systems and Methods for Stalk Sensing," U.S. patent application Ser. No. 17/226,002 filed April 8, 2021, and entitled "Apparatus, Systems and Methods for Stalk Sensing," U.S. Patent 10,813,281, issued October 27, 2020, entitled "Apparatus, Systems, and Methods for Applying Fluid," U.S. patent application Ser. No. 16/371,815, filed April 1, 2019, entitled "Devices, Systems, and Methods for Seed Trench Protection," U.S. patent application Ser. No. 16,523,343, filed July 26, 2019, entitled "Closing Wheel Downforce Adjustment Devices, Systems, and Methods," U.S. patent application Ser. No. 16/670,692, filed October 31, 2019, entitled "Soil Sensing Control Devices, Systems, and Associated Methods," U.S. patent application Ser. No. 16/684,877, filed November 15, 2019, entitled "On-The-Go Organic Matter Sensor and Associated Systems and Methods," U.S. Patent 11,523,554, issued December 13, 2022, entitled "Dual Seed Meter and Related Systems and Methods," U.S. patent application Ser. No. 16/891,812, filed June 3, 2020, entitled "Apparatus, Systems and Methods for Row Cleaner Depth Adjustment On-The-Go," U.S. patent application Ser. No. 16/918,300, filed July 1, 2020, entitled "Apparatus, Systems, and Methods for Eliminating Cross-Track Error," U.S. patent application Ser. No. 16/921,828, filed July 6, 2020, entitled "Apparatus, Systems and Methods for Automatic Steering Guidance and Visualization of Guidance Paths," U.S. patent application Ser. No. 16/939,785, filed Jul. 27, 2020, entitled "Apparatus, Systems and Methods for Automated Navigation of Agricultural Equipment," U.S. patent application Ser. No. 16/997,361, filed Aug. 19, 2020, entitled "Apparatus, Systems and Methods for Steerable Toolbars," U.S. patent application Ser. No. 16/997,040, filed August 19, 2020, entitled "Adjustable Seed Meter and Related Systems and Methods," U.S. patent application Ser. No. 17/011,737, filed Sep. 3, 2020, entitled "Planter Row Unit and Associated Systems and Methods," U.S. patent application Ser. No. 17/060,844, filed October 1, 2020, entitled "Agricultural Vacuum and Electrical Generator Devices, Systems, and Methods," U.S. patent application Ser. No. 17/105,437, filed Nov. 25, 2020, entitled "Devices, Systems and Methods For Seed Trench Monitoring and Closing," U.S. patent application Ser. No. 17/127,812, filed Dec. 18, 2020, entitled "Seed Meter Controller and Associated Devices, Systems and Methods," U.S. patent application Ser. No. 17/132,152, filed Dec. 23, 2020, entitled "Use of Aerial Imagery For Vehicle Path Guidance and Associated Devices, Systems, and Methods," U.S. patent application Ser. No. 17/164,213, filed Feb. 1, 2021, entitled "Row Unit Arm Sensor and Associated Systems and Methods," U.S. patent application Ser. No. 17/170,752, filed Feb. 8, 2021, entitled "Planter Obstruction Monitoring and Associated Devices and Methods," U.S. patent application Ser. No. 17/225,586, filed Apr. 8, 2021, entitled "Devices, Systems, and Methods for Corn Headers," U.S. patent application Ser. No. 17/225,740, filed Apr. 8, 2021, entitled "Devices, Systems, and Methods for Sensing the Cross Sectional Area of Stalks," U.S. patent application Ser. No. 17/323,649, filed May 18, 2021, entitled "Assisted Steering Apparatus and Associated Systems and Methods," U.S. patent application Ser. No. 17/369,876, filed Jul. 7, 2021, entitled "Apparatus, Systems, and Methods for Grain Cart-Grain Truck Alignment and Control Using GNSS and/or Distance Sensors," U.S. patent application Ser. No. 17/381,900, filed Jul. 21, 2021, entitled "Visual Boundary Segmentations and Obstacle Mapping for Agricultural Vehicles," U.S. patent application Ser. No. 17/461,839, filed Aug. 30, 2021, entitled "Automated Agricultural Implement Orientation Adjustment System and Related Devices and Methods," U.S. patent application Ser. No. 17/468,535, filed Sep. 7, 2021, entitled "Apparatus, Systems, and Methods for Row-by-Row Control of a Harvester," U.S. patent application Ser. No. 17/526,947, filed Nov. 15, 2021, entitled "Agricultural High Speed Row Unit," U.S. patent application Ser. No. 17/566,678, filed Dec. 20, 2021, entitled "Devices, Systems, and Method For Seed Delivery Control," U.S. patent application Ser. No. 17/576,463, filed Jan. 14, 2022, entitled "Apparatus, Systems, and Methods for Row Crop Headers," U.S. patent application Ser. No. 17/724,120, filed April 19, 2022, entitled "Automatic Steering Systems and Methods," U.S. patent application Ser. No. 17/742,373, filed May 11, 2022, entitled "Calibration Adjustment for Automatic Steering Systems," U.S. patent application Ser. No. 17/902,366, filed Sep. 2, 2022, entitled "Tile Installation System with Force Sensor and Related Devices and Methods," U.S. patent application Ser. No. 17/939,779, filed Sep. 7, 2022, entitled "Row-by-Row Estimation System and Related Devices and Methods," U.S. patent application Ser. No. 18/081,432, filed Dec. 14, 2022, entitled "Seed Tube Guard and Associated Systems and Methods of Use," U.S. patent application Ser. No. 18/087,413, filed Dec. 22, 2022, entitled "Data Visualization and Analysis for Harvest Stand Counter and Related Systems and Methods," U.S. patent application Ser. No. 18/097,801, filed Jan. 17, 2023, entitled "Agricultural Mapping and Related Systems and Methods," U.S. patent application Ser. No. 18/101,394, filed Jan. 25, 2023, entitled "Seed Meter with Integral Mounting Method for Row Crop Planter and Associated Systems and Methods," U.S. Patent Application 63/315,850, filed Mar. 2, 2022, entitled "Cross Track Error Stalk Sensor," U.S. Patent Application 63/346,665, filed May 27, 2022, entitled "Seed Delivery Tube Camera for Furrow Monitoring," U.S. Patent Application 63/351,602, filed Jun. 13, 2022, entitled "Apparatus, Systems and Methods for Image Plant Counting," U.S. Patent Application 63/357,082, filed Jun. 30, 2022, entitled "Seed Tube Guard," U.S. Patent Application 63/357/284, filed Jun. 30, 2022, entitled "Grain Cart Bin Level Sharing," U.S. Patent Application 63/394,843, filed Aug. 3, 2022, entitled "Hydraulic Cylinder Position Control for Lifting and Lowering Towed Implements," U.S. Patent Application 63/395,061, filed Aug. 4, 2022, entitled "Seed Placement in Furrow," U.S. Patent Application 63/400,943, filed Aug. 25, 2022, entitled "Combine Yield Monitor," U.S. Patent Application 63/406,151, filed Sep. 13, 2022, entitled "Hopper Lid with Magnet Retention and Related Systems and Methods," U.S. Patent Application 63/427,028, filed Nov. 21, 2022, entitled "Stalk Sensors and Associated Devices, Systems and Methods."

Although the disclosure has been described with references to various embodiments, persons skilled in the art will recognized that changes may be made in form and detail without departing from the spirit and scope of this disclosure.

What is claimed is:

1. A load cell adaptor comprising:

(a) a first side comprising at least one contact pad configured to contact a flat portion of a shank of a row unit adjacent to a tangent of a die formed radius of the shank;

(b) a second side comprising a seat, the seat shaped to be engaged with a load cell, the seat comprising a planar contact surface for mounting the load cell; and (c) an opening shaped for insertion of a bolt therethrough, wherein the adaptor provides a consistent surface for mounting the load cell on the row unit such that the at least one contact pad on the first side contacts the row unit and the load cell is mounted outward of a surface of the row unit on the planar contact surface of the seat.

2. The load cell adaptor of claim 1, further comprising three contacts pads on the first side.

3. The load cell adaptor of claim 1, further comprising at least one alignment pin on the first side.

4. The load cell adaptor of claim 3, further comprising two alignment pins on the first side disposed on opposing sides of the opening.

5. The load cell adaptor of claim 3, further comprising a notch shaped within the first side.

6. The load cell adaptor of claim 5, wherein the notch is a water drain.

* * * * *